(No Model.) 2 Sheets—Sheet 1.

J. T. CARRINGTON.
STOCK OR HAY FRAME.

No. 341,729. Patented May 11, 1886.

WITNESSES:
O. Neveux
C. Sedgwick

INVENTOR:
J. T. Carrington
BY Munn & Co.
ATTORNEYS.

(No Model.) 2 Sheets—Sheet 2.
J. T. CARRINGTON.
STOCK OR HAY FRAME.
No. 341,729. Patented May 11, 1886.
*Fig. 3*
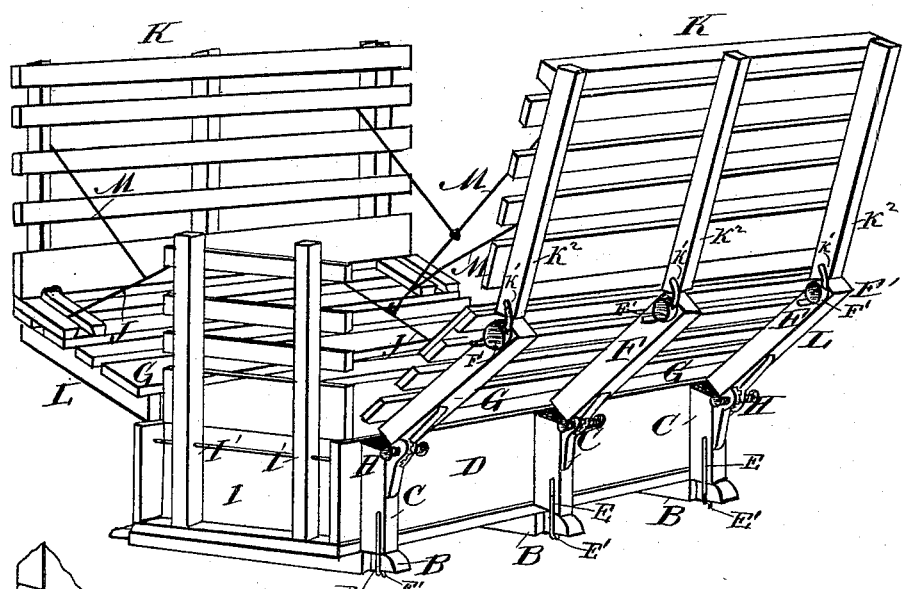
*Fig. 5.*
*Fig. 4*
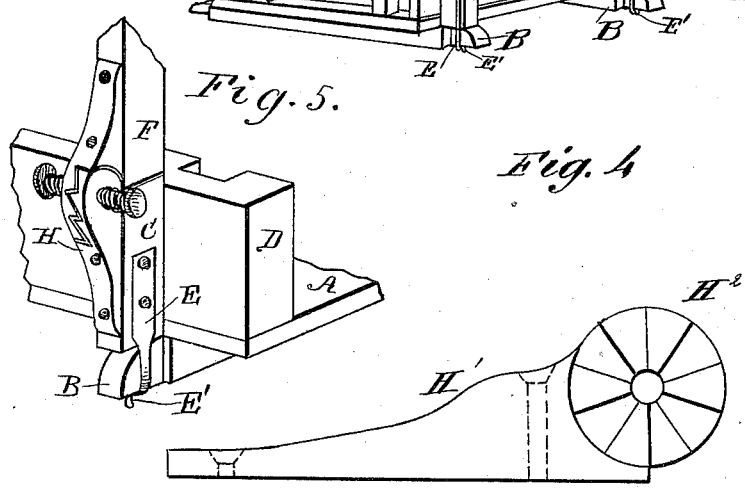
WITNESSES:
O. Neveux
C. Sedgwick
INVENTOR:
J. T. Carrington
BY Munn & Co.
ATTORNEYS.

UNITED STATES PATENT OFFICE.

JOHN T. CARRINGTON, OF CLAY CENTRE, KANSAS, ASSIGNOR TO HIMSELF AND BENJAMIN F. FLENNIKEN, OF SAME PLACE.

STOCK OR HAY FRAME.

SPECIFICATION forming part of Letters Patent No. 341,729, dated May 11, 1886.

Application filed October 15, 1885. Serial No. 179,965. (No model.)

*To all whom it may concern:*

Be it known that I, JOHN T. CARRINGTON, of Clay Centre, in the county of Clay and State of Kansas, have invented a new and Improved Stock and Hay Frame and Stock-Loader, of which the following is a full, clear, and exact description.

The object of my invention is to provide a new and improved frame or wagon-box which can be used for stock or for hay and other like material, and which facilitates the loading of the animals into the wagon or other vehicle for transportation.

The invention consists in the construction and combination of parts and details, as will be fully described and set forth hereinafter, and pointed out in the claims.

Reference is to be had to the accompanying drawings, forming a part of this specification, in which similar letters of reference indicate corresponding parts in all the figures.

Figure 1:
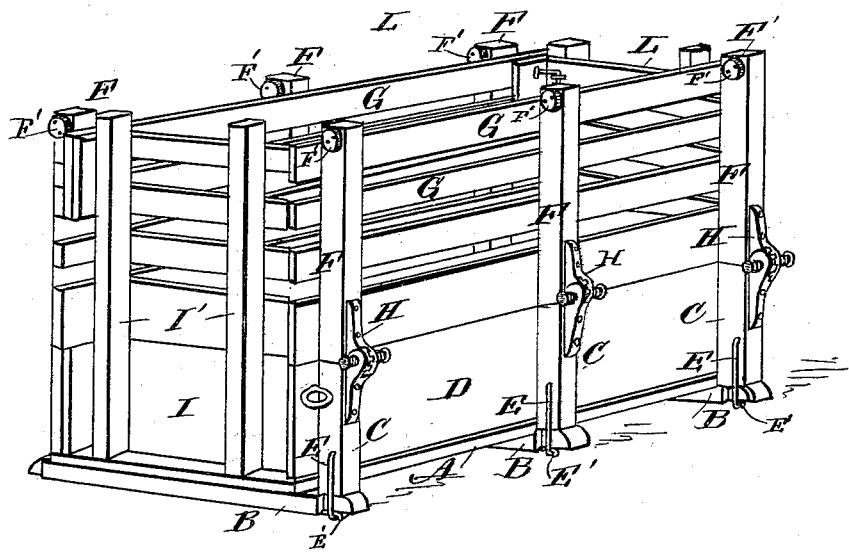
Figure 2:
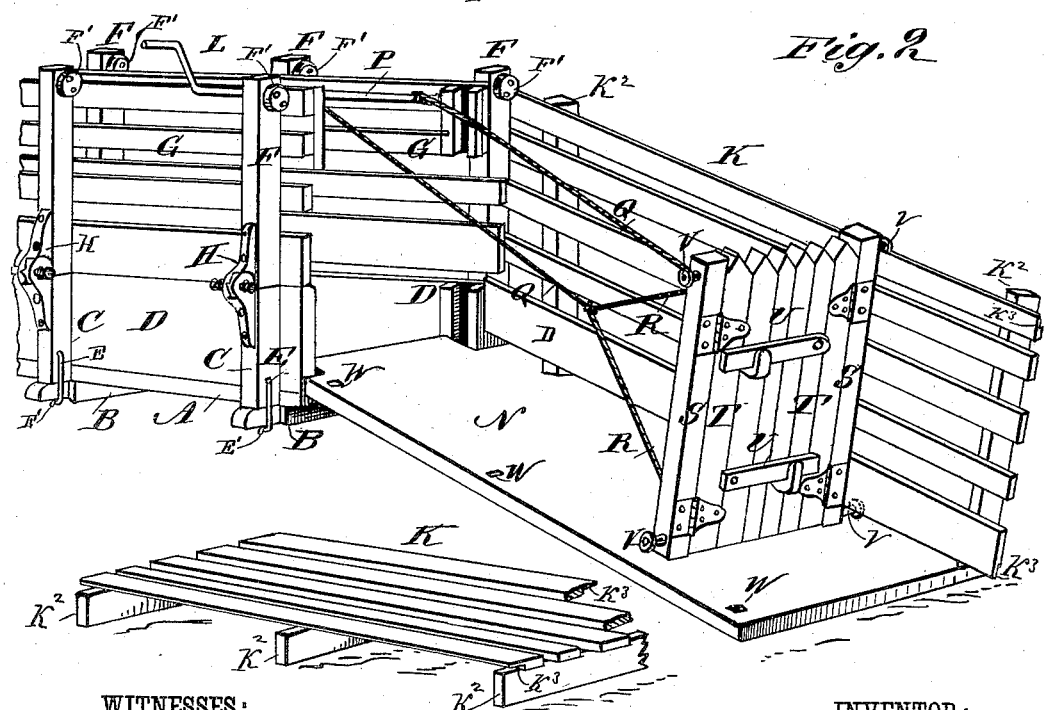

Figure 1 is a perspective view of my improved stock and hay frame, the same being closed. Fig. 2 is a perspective view of the same with the stock-loader, one of the sides, K, being removed to better show the gates and their operating mechanism. Fig. 3 is a perspective view of the same adjusted as a hay-rack. Fig. 4 is an enlarged side view of a hinge section. Fig. 5 is a detail perspective view showing, among other parts, the hinge connecting the uprights C F and the loop and hook connecting the cross-piece B with the upright C.

The floor A of the wagon-box is secured on transverse base-pieces B, on the ends of which short uprights C are held, the side boards, D, of the box being secured between the inner sides of the uprights by bolts. Staples or loops E are secured on the lower ends of uprights C, and are passed around hooks E' on the under sides of the cross-pieces B, below the uprights C.

The adjustable side pieces of the frame are formed of a series of uprights, F, on which the longitudinal rails G are secured, said uprights F having their lower ends hinged to the upper ends of the corresponding uprights, C, by hinges H, that will be described hereinafter. The sides of the frame are arranged to swing outward.

The end boards, I, of the box are provided with uprights I', to which transverse slats are secured, thus forming the ends of the frame.

The hinges H are each formed of two sections, H', each provided with a centrally-apertured disk, H², having radial ratchet-teeth or corrugations on the sides facing each other. Before swinging the side piece L of the frame outward said side piece must be moved in the direction of its length to disengage the teeth of the disks H², and when the side piece has the desired inclination to the lower parts of the box the teeth of the disks are engaged again, and are held together by coiled springs around the pintles, that connect the sections H'. The side pieces are then braced by rods J, secured to the side pieces near their outer or free edges, and to the posts or uprights I' of the end-gates, as shown in Fig. 3. Lattice-work or rail side pieces K are placed on the side pieces L at the outer edges of the same, and are held vertically on them by curved rods K', secured on the lower ends of uprights K², which pass through castings F', having curved slots and secured to the top of the uprights F, and rods M, extending from the rods J to said side pieces K. A hay-rack adapted to hold a large quantity of hay, even during windy weather, is thus formed. If desired, said side pieces K may be left off.

To load stock into the box, one end-gate or end-board is removed, the gang-plank N is placed in an inclined position, resting on the bottom of the box and on the ground, and the above-mentioned sides K are held by means of their curved rods K' on the sides of the gang-plank, said rods being passed through the apertures W in the gang-plank. The sides K, by being thus removable, serve as sides to the hay-frame and sides to the gang-plank when used in loading stock. The top and bottom rails of these sides are formed on their outer sides with grooves or rabbets K³, so that a space will be formed between said slats and the ends of the uprights K², for the purpose to be presently described. A crank-shaft, P, is passed through the side pieces L at the rear upper corners, and on the same two ropes, Q, are secured, which have their opposite ends connected with ropes R, secured to the top and bottom of posts S, to each of which a strong gate, T, is hinged, each provided with a latch, U, and a hook for receiving the latch of the other gate. The gates T are held to the sides K by rollers V, secured to the top and bottom of the outer edges of the posts S, and running in the rabbets or groove $K^3$ in the top and bottom rails of the sides. The gates T are opened, and the animals are driven on the gang-plank N. Then the gates T are closed behind the animals and held together by the latches U. The ropes Q are then wound on the shaft P, and thereby the gate is pulled upward on the gang-plank N and forces the animal upward and into the box.

The stock-loader can be used on railroads or in private stock-yard chutes by securing tracks instead of the rollers V along the inner side of the chute and inserting a crank-shaft, P, high enough for the stock to pass beneath it, the ropes Q passing through pulleys beneath the crank-shaft and opposite the middle of the track.

The box when closed for the transportation of the animals—such as calves, hogs, sheep, &c.—is shown in Fig. 1.

The animals can be loaded into wagons, cars, &c., very rapidly.

Having thus fully described my invention, I claim as new and desire to secure by Letters Patent—

1. The combination, with the floor A, having transverse pieces B on its under side, provided on their lower faces at their outer ends with the hooks or projections E', of the uprights C, having the loops or staples E on their lower ends, receiving the ends of the pieces B and engaging the projections or hooks E' on the same, and the side boards, D, secured to the uprights C, substantially as set forth.

2. The combination, with the wagon-box, of outwardly-swinging adjustable sides G and lock-hinges connecting the said sides to the sides of the wagon-box, the arms of the hinges having interlocking teeth or corrugations, whereby the swinging sides may be adjusted at any desired angle to the wagon-box, substantially as set forth.

3. The combination, with the wagon-box having uprights C, and the sides G, having uprights F, of the lock-hinges H, connecting the uprights C F and formed of two sections H', each having ratchet-teeth or corrugations, and the pintle connecting said sections and provided with springs to allow of the separation of the said sections, substantially as set forth.

4. The combination, with a wagon-box having outwardly-swinging sides G, of the sides K, secured removably to the upper edge of the sides G, substantially as set forth.

5. The combination, in a wagon, of the sides K, having uprights $K^2$, and the curved rods K' on the lower ends of the uprights, with the castings F', having curved apertures or slots to receive the rods, substantially as set forth.

6. The combination, with the wagon-box provided with the removable sides K, having the curved rods or projections K', of the gang-plank N, having the apertures W, to receive the said rods K' and form a loading-chute, substantially as set forth.

7. The combination, with the wagon-box having the removable sides K, provided with the curved rods or projections K', of the gang-plank N, having the holes W, to receive the rods or projections and form a chute, the posts S, having the gates T hinged thereto, rollers V on the posts and engaging the top and bottom rails of the said sides, the shaft P, and the cords connecting the gates and shaft, substantially as set forth.

JOHN T. CARRINGTON.

Witnesses:
 JOHN F. RYERSON,
 JESSE DEVER.